United States Patent
Ruggiero et al.

(10) Patent No.: US 8,333,551 B2
(45) Date of Patent: Dec. 18, 2012

(54) EMBEDDED FIBER OPTIC SENSING DEVICE AND METHOD

(75) Inventors: Eric John Ruggiero, Rensselaer, NY (US); Kevin Thomas McCarthy, Troy, NY (US); Christopher Edward Wolfe, Niskayuna, NY (US); Hua Xia, Altamont, NY (US); Bala Corattiyil, Cincinnati, OH (US); Kenneth Lee Fisher, Blue Ash, OH (US)

(73) Assignee: General Electric Company, Niskayuna, NY (US)

( * ) Notice: Subject to any disclaimer, the term of this patent is extended or adjusted under 35 U.S.C. 154(b) by 1481 days.

(21) Appl. No.: 11/864,559

(22) Filed: Sep. 28, 2007

(65) Prior Publication Data
US 2009/0087303 A1    Apr. 2, 2009

(51) Int. Cl.
*F01D 11/02* (2006.01)
(52) U.S. Cl. .................................... 415/118; 415/174.2
(58) Field of Classification Search .................. 277/355; 415/118, 173.3, 174.2
See application file for complete search history.

(56) References Cited

U.S. PATENT DOCUMENTS

| | | | | |
|---|---|---|---|---|
| 4,546,836 A | * | 10/1985 | Dennis et al. | 175/107 |
| 4,600,202 A | * | 7/1986 | Schaeffler et al. | 277/355 |
| 5,345,519 A | | 9/1994 | Lu | |
| 5,528,367 A | * | 6/1996 | Putnam et al. | 356/480 |
| 5,528,712 A | * | 6/1996 | Belenkiy et al. | 385/78 |
| 5,598,494 A | * | 1/1997 | Behrmann et al. | 385/59 |
| 5,635,919 A | * | 6/1997 | Schier | 340/870.26 |
| 5,841,529 A | * | 11/1998 | Sirkis et al. | 356/481 |
| 5,961,279 A | * | 10/1999 | Ingistov | 415/170.1 |
| 5,986,749 A | * | 11/1999 | Wu et al. | 356/73.1 |
| 6,141,087 A | | 10/2000 | Viel | |
| 6,226,975 B1 | * | 5/2001 | Ingistov | 60/772 |
| 6,518,770 B2 | * | 2/2003 | Childs | 324/545 |
| 6,622,490 B2 | * | 9/2003 | Ingistov | 60/782 |
| 6,996,885 B2 | * | 2/2006 | Szymbor et al. | 29/402.02 |
| 7,059,827 B1 | * | 6/2006 | Ingistov | 415/170.1 |
| 7,151,872 B1 | | 12/2006 | Xia et al. | |
| 7,565,729 B2 | * | 7/2009 | Adis et al. | 29/505 |
| 2006/0215959 A1 | | 9/2006 | McCarthy et al. | |

* cited by examiner

*Primary Examiner* — Edward Look
*Assistant Examiner* — Sean J Younger
(74) *Attorney, Agent, or Firm* — Richard A. DeCristofaro

(57) ABSTRACT

A device operating in an environment includes a fiber optic sensing system having one or more fiber optic sensors disposed in the device and configured to detect one or more parameters related to the device. The parameters may include temperature, strain, pressure, vibration, or combinations thereof.

21 Claims, 9 Drawing Sheets

EMBEDDED FIBER OPTIC SENSING DEVICE AND METHOD

BACKGROUND

The invention relates generally to fiber optic sensing devices, and more particularly, to a fiber optic sensing device for detecting multiple parameters of a device operating in an environment, for example, in a turbomachinery environment including brush sealing system, a rotor thrust bearing, or the like.

Various sensing devices are known and are generally in use. For example, thermocouples are used for measuring the temperature in components of a device, such as exhaust systems, combustors, turbomachineries, and so forth. In certain other instances, sensing systems are employed to detect physical parameters such as, strain or temperature in an infrastructure. However, such conventional sensing devices are limited by the operational conditions in which they may be employed. For example, conventional sensing devices are often limited to relatively mild temperature conditions and, as such, limited operational temperature ranges.

In one example, thermocouples are provided proximate to brush seals located in test rigs. The data collected during testing period is then extrapolated to turbo machines operating in real time conditions. In certain other instances, proximity probe data or accelerometer data is collected during a rotor's life cycle to identify rotor growth and vibration problems. However, it was difficult to extract exact temperature data at the interface between the seal and the rotor. Moreover, it was also difficult to sense induced strain at the rotor-seal interface.

Conventionally, the measurement of thrust on rotor bearing of rotary machine has been accomplished by the application of electrical resistance strain gages to a bearing housing or bearing race. Unfortunately, this electrical resistance strain gage technology of the existing art encounters several problems and limitations. One problem encountered is that the strain gage indicated output is dependent upon its temperature environment at any thrust load, thus inducing errors into the measurement. In addition, the strain gages are subject to mechanical fatigue failure and, thus, loss of signal. Another problem is that the strain gages are subject to electrical magnetic interference or other induced electrical noise, thus inducing errors into the thrust load measurement. Yet another problem encountered is that the strain gages are not an absolute measurement, as they require an electrical tare balance and other thermal compensations. Also, the electrical resistance-based strain gage possesses a calibration constant known as the gage factor, which varies as a function of temperature and can produce an error in the indicated thrust measurement. The conventional technique also does not effectively address the issues relating to mitigation of thrust load on the bearings.

There is a need for a device and method that effectively extracts the temperature and strain data of a device operating in an environment. There is also a need of a technique for accurate measurement and control of thrust load on a rotor bearing.

BRIEF DESCRIPTION

In accordance with one exemplary embodiment of the present invention, a device operating in an environment is disclosed. The device includes a fiber optic sensing system having one or more fiber optic sensors disposed in the device and configured to detect one or more parameters related to the device. The parameters may include temperature, strain, pressure, vibration, or combinations thereof.

In accordance with another exemplary embodiment of the present invention, a rotary machine is disclosed. The rotary machine includes a rotary component disposed inside a stationary component. A brush sealing system is disposed between the stationary component and the rotary component. The brush sealing system includes a holding device coupled to the stationary component. The sealing system also includes a plurality of bristles, each bristle having a first end coupled to the holding device and a second end protruding from the holding device towards the rotary component. A fiber optic sensing system includes one or more fiber optic sensors disposed between the bristles and configured to detect one or more parameters related to the brush sealing system. The parameters may include temperature, strain, pressure, vibration, or combinations thereof.

In accordance with another exemplary embodiment of the present invention, a brush sealing system is disclosed. The brush sealing system includes a holding device coupled to the stationary component. The sealing system also includes a plurality of bristles, each bristle having a first end coupled to the holding device and a second end protruding from the holding device. A fiber optic sensing system includes one or more fiber optic sensors disposed between the bristles and configured to detect one or more parameters related to the brush sealing system. The parameters may include temperature, strain, pressure, vibration, or combinations thereof.

In accordance with another exemplary embodiment of the present invention, a method includes directing light from a light source to at least two fiber optic sensors disposed between a plurality of bristles. Reflected light from the at least two fiber optic sensors is received using a detection system. One or more parameters related to the brush sealing system such as temperature, strain, pressure, vibration, or combinations thereof are detected based on shift in wavelength of light reflected from the at least two fiber optic sensors.

In accordance with yet another exemplary embodiment of the present invention, a method of controlling a thrust load on a thrust bearing coupled to a rotor of a rotary machine during operation of the rotary machine is disclosed. The method includes directing light from a light source to one or more fiber optic sensors disposed proximate the thrust bearing. Reflected light from the at least two fiber optic sensors is received using a detection system. One or more parameters related to the trust bearing such as temperature, strain, pressure, vibration, or combinations thereof are detected based on shift in wavelength of light reflected from the at least two fiber optic sensors. A thrust load on the thrust bearing is determined based on the detected one or more parameters related to the thrust bearing. A hydraulic device is actuated to direct a hydraulic fluid from the hydraulic device to the thrust bearing to counteract the thrust load on the bearing.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention discloses a device operating in an environment, including a fiber optic sensing system having one or more fiber optic sensors disposed in the device and configured to detect one or more parameters related to the device comprising temperature, strain, pressure, vibration, or combinations thereof. In one exemplary embodiment, the device includes a rotary machine having a brush sealing system and a fiber optic sensing system having sensors disposed in the brush sealing system and configured to detect one or more parameters related to the brush sealing system comprising temperature, strain, pressure, vibration, or combinations thereof. In another exemplary embodiment, the device includes a rotary machine having one or more thrust bearings coupled to a rotor and a fiber optic sensing system having sensors disposed proximate to the thrust bearings. The sensing system is configured to detect one or more parameters related to the thrust bearing comprising static strain, dynamic strain, or combinations thereof. The sensing system determines a thrust load of the thrust bearing based on the sensed parameters. The sensing system actuates a hydraulic device based on the thrust load to direct a hydraulic fluid to the thrust bearing to mitigate the thrust load. In another exemplary embodiment, the sensing system pressurizes a cavity on one side of the thrust bearing to mitigate the thrust load. In another exemplary embodiment, a method for detecting one or more parameters of the brush sealing system in a rotary machine is disclosed. In yet another exemplary embodiment, a method for controlling a thrust load on bearings in a rotary machine is disclosed. Embodiments of the present invention provides a real time and accurate feedback of data pertaining to temperature, strain, or the like of a device operating in an environment, for example turbomachinery environment. As a result, it is possible to determine the working condition or performance of the rotary machine. Proactive measures may be undertaken to avoid machine downtime or process inefficiency based on the sensed data. Also, the fiber sensing system operates effectively in harsh environments, such as high temperature conditions, harsh oil conditions, or the like. The sensing system may be effectively used to determine and mitigate thrust load in thrust bearings provided to a rotor of the rotary machine, for example.

Figure 1:
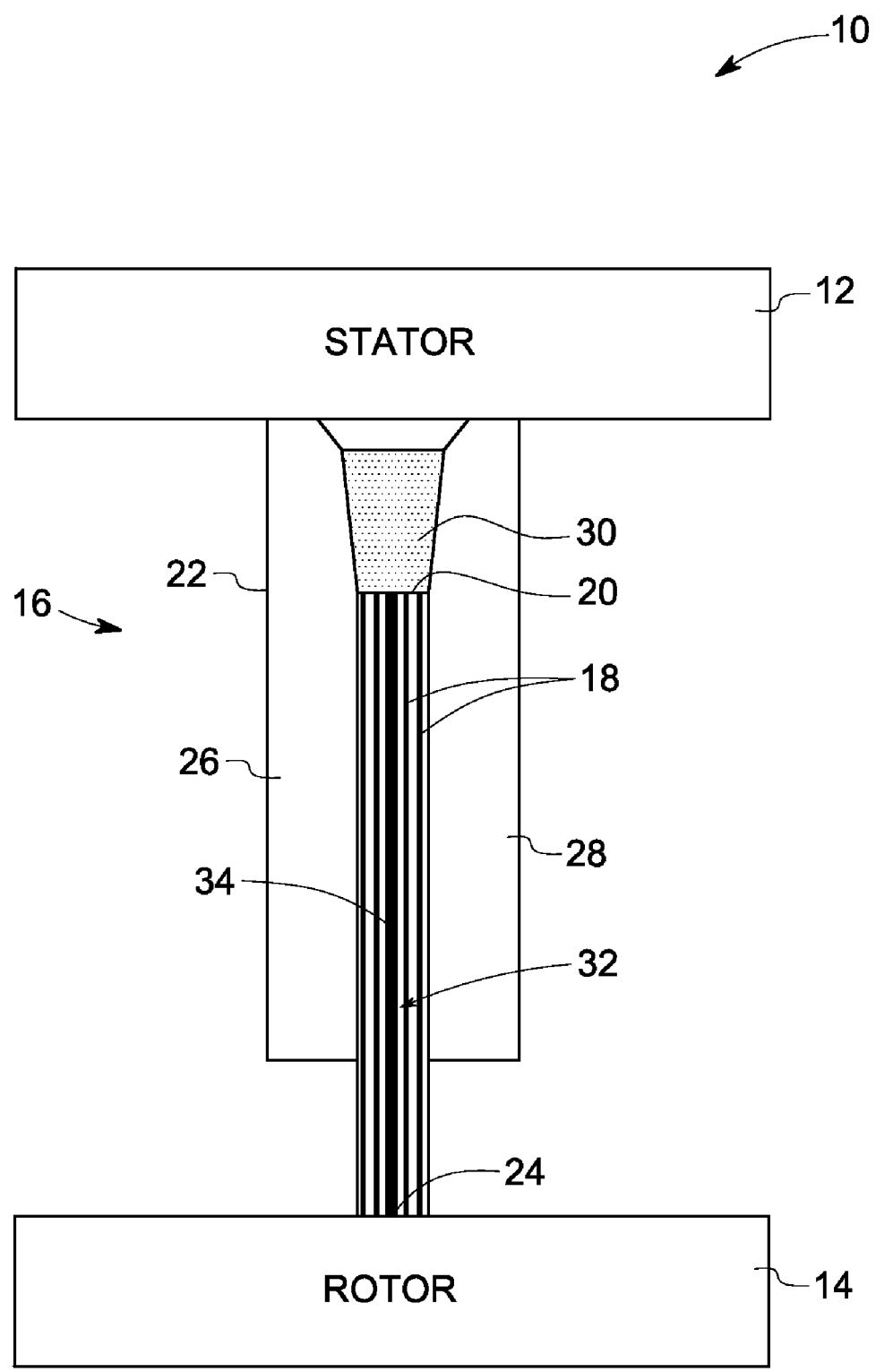
FIG. 1 is a diagrammatical view of a brush sealing segment of a brush sealing system in accordance with an exemplary embodiment of the present invention.

Referring to FIG. 1, a rotary machine 10 in accordance with an exemplary aspect of the present invention is illustrated. In examples, without limitation, the rotary machine 10 may be a centrifugal compressor, or a steam turbine, or a gas turbine, or a bearing, or a sump, or the like. It may also be noted that the aspects of the present invention are not limited to an association with the rotary machine and may be associated with other machines subjected to harsh environmental conditions during machine operation.

In the illustrated embodiment, the rotary machine 10 includes a stator (stationary component) 12, and a rotor (rotary component) 14 disposed inside the stator 12. The rotor 14 is radially spaced apart from the stator 12 to define a gap between the stator 12 and the rotor 14. Although in the illustrated embodiment, the stator 12 circumferentially surrounds the rotor 14, certain other applications require the rotor to circumferentially surround the stator as known to those skilled in the art. A fluid is typically disposed in the gap in such a way that the fluid has a pressure drop generally transverse to the gap. The pressure drop is generated during operation of the machine 10. A brush sealing system 16 is disposed between the stator 12 and rotor 14. The brush sealing system 16 in accordance with aspects of the present invention includes a plurality of bristles 18 configured to contact the rotor 14 to reduce leakage of fluid at a seal-rotor interface.

In the illustrated embodiment, each bristle 18 includes a first end 20 coupled to a housing 22 and a second end 24 disposed proximate to the rotor 14. In certain exemplary embodiments, the second end 24 of the bristle 18 is configured to contact the rotor 14. In the illustrated embodiment, the housing 22 includes a first plate 26, a second plate 28, and a matrix 30 disposed between the first plate 26 and the second plate 28. In certain exemplary embodiments, the first and second plates 26, 28 include a metallic material, or a composite material, or a combination thereof. The bristles 18 are clamped between the first and the second plates 26, 28. The first end 20 of each bristle 18 is coupled to the matrix 30 and the second end 24 protrudes from the plates 26, 28 towards the rotor 14. Typically, the brush sealing system 16 is configured to contact the rotor 14 thereby generating frictional heat at the seal-rotor interface during operation of the machine.

A fiber optic sensing system 32 having one or more fiber optic sensors 34 is disposed between the bristles 18. During operation of the machine, the sensing system 32 is configured to detect one or more parameters related to the brush sealing system 32 including temperature, strain, pressure, vibration, or combinations thereof. As a result, it is possible to determine the working condition and performance of the sealing system 32 based on the sensed data. The details of the fiber optic sensing system 32 are explained in greater detail with reference to subsequent figures.

Figure 2:
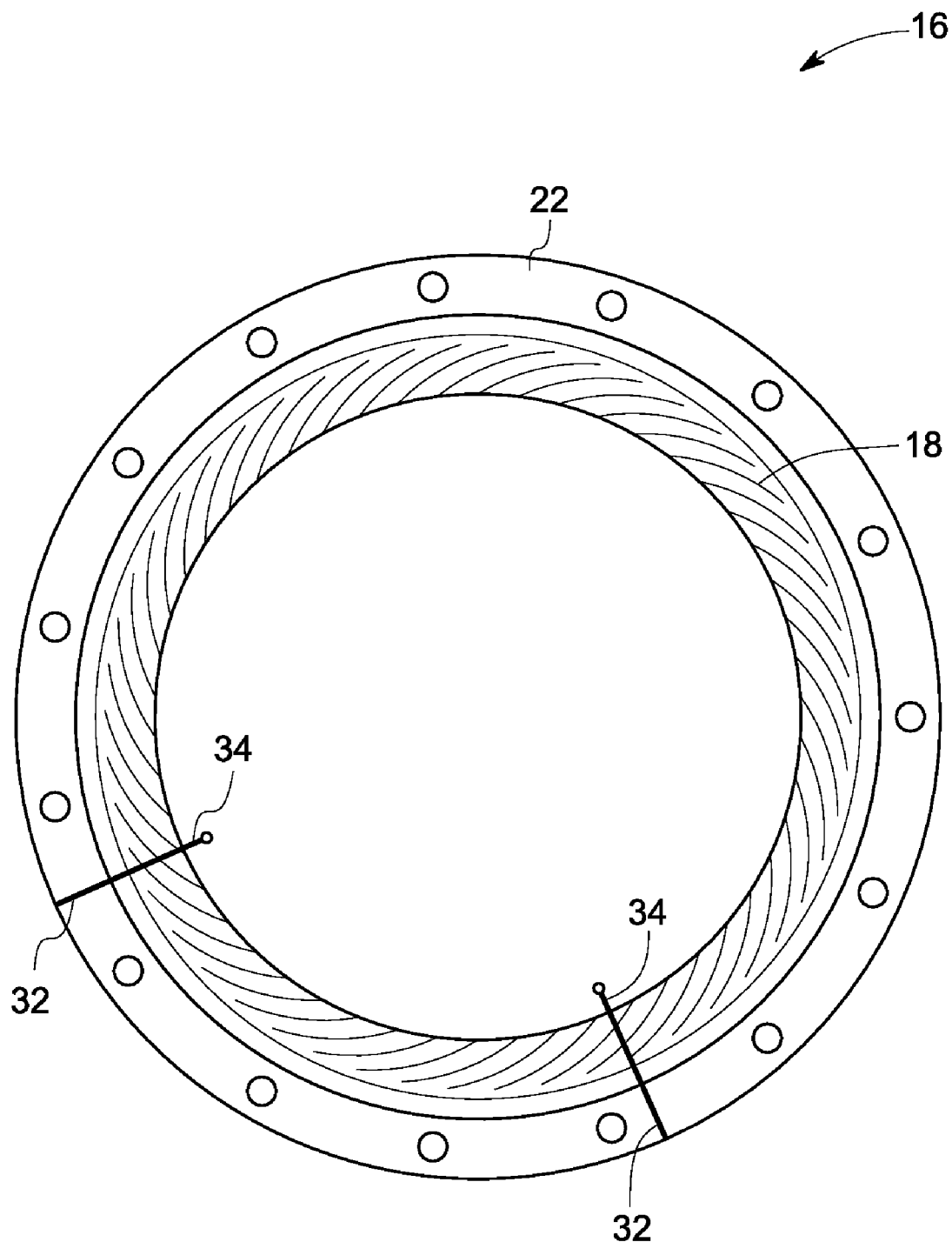
FIG. 2 is a diagrammatical view of a brush sealing system having a plurality of fiber optic sensors.

Referring to FIG. 2, a brush sealing system 16 having the fiber optic sensing system 32 is illustrated. As discussed above, the bristles 18 of the brush sealing system 16 is clamped against the housing 22. The plurality of bristles 18 are configured to contact the rotor to reduce leakage of fluid at a seal-rotor interface. The fiber optic sensing system 32 includes the plurality of fiber optic sensors 34 (only two sensors are illustrated) disposed between the bristles 18. In the exemplary embodiment, the fiber optic sensors 34 are aligned with the bristles 18. In the illustrated embodiment, the sensors 34 are disposed along the circumferential direction of the sealing system 16. During operation of the machine, the sensors 34 are configured to detect one or more parameters related to the brush sealing system 32 including temperature, strain, pressure, vibration, or combinations thereof. In the illustrated embodiment, one sensor 34 may detect temperature, and the other sensor 34 may be used to detect strain at the seal-rotor interface. The combination of temperature and strain information may be used to determine the performance and working condition of the sealing system and rotor. The sensing system 32 is used in a non-intrusive manner to obtain the sensed data from the seal-rotor interface. In other words, the sensed data provides information related to operational gap between the seal and rotor and also about the strain state of the sealing system. As a result, proactive measures may be undertaken to avoid downtime or process inefficiency based on the real time sensed data.

Figure 3:
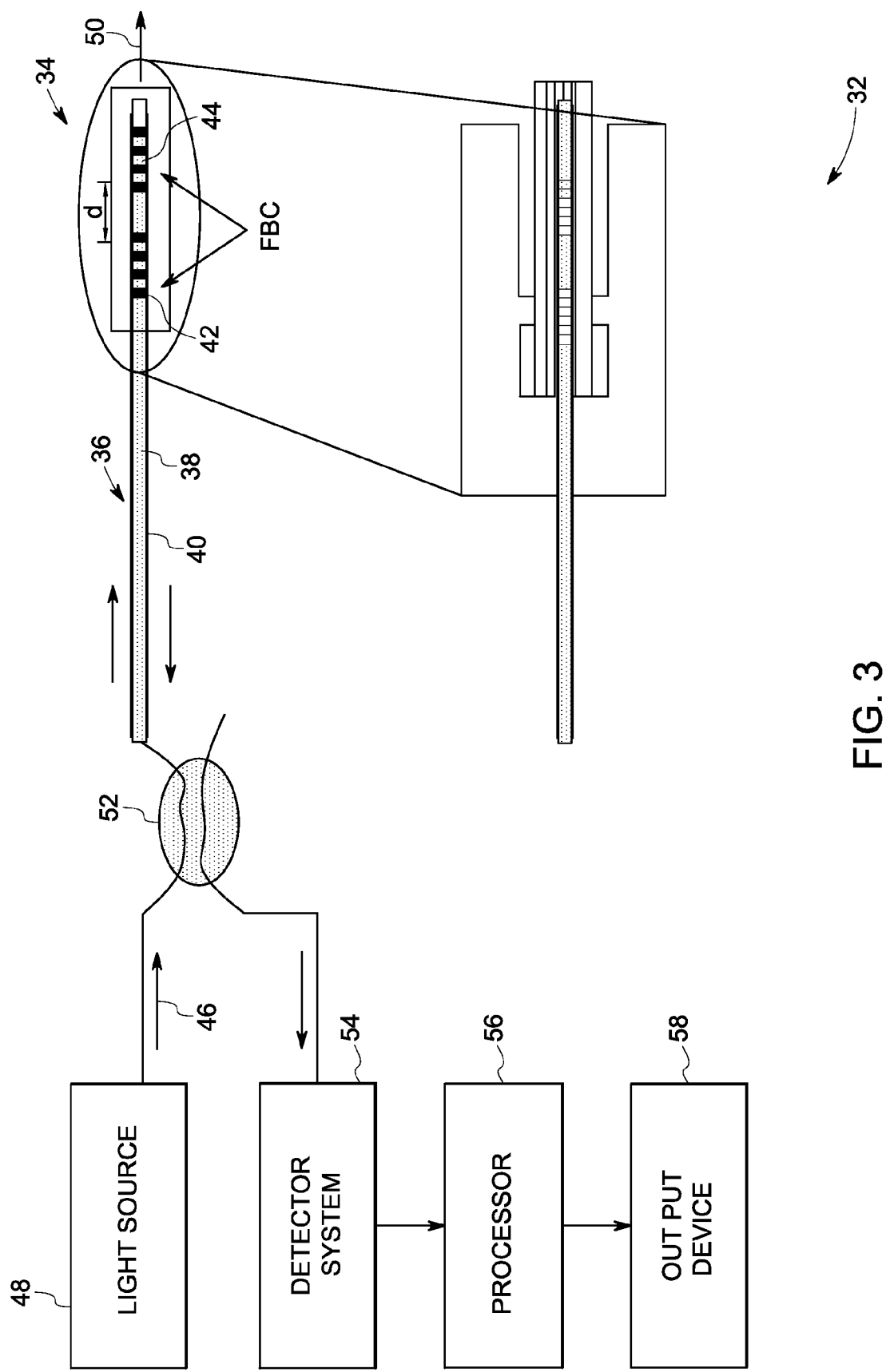
FIG. 3 is a diagrammatical view of a fiber optic sensing system in accordance with an exemplary embodiment of the present invention.

Referring to FIG. 3, a fiber optic sensing system 32 in accordance with the exemplary embodiment of the present invention is illustrated. Each sensor 34 includes a fiber optic sensor cable 36 having aperiodic refractive index modulation. The fiber optic sensor cable 36 includes a core 38 and a cladding 40 that is disposed circumferentially about the core 38. A series of grating elements 42, 44 are spaced apart by a predetermined distance "d" and disposed within the core 38 and are configured to reflect in phase, wavelengths of light corresponding to a grating period of the grated elements 42, 44. The cladding 40 provides for near total internal reflection of light within the cable 36, thereby allowing light to be transmitted by and axially through the cable 36. The plurality of grating elements 42, 44 have an index of refraction different that of core 38. Although only two grating elements 42, 44 are illustrated, in other embodiments, more than two grating elements maybe used. During operation, an input light 46 signal is provided from a light source 48 to the sensor cable 36 and a portion of the input light signal 46 is reflected by the grating elements 42, 44 in phase and corresponding to certain wavelengths of light, while remaining wavelengths are transmitted as represented by a transmitted signal 50. The index of refraction of the grating elements 42, 44 and distance between the grating elements 42, 44 define the wavelength of light reflected in phase by the grating elements 42, 44.

The sensing system 32 also includes an optical coupler 52 configured to regulate the incoming light signal 46 from the light source 48 and also the reflected signals from the cable 36. The optical coupler 52 directs the appropriate reflected signals to a detector system 54 such as a photo detector system. The detector system 54 receives the reflected optical signals from the cable 36 and provides an output signal to a processor 56. The processor 56 is configured to analyze the embedded information in the output signal from the detector system 54 and estimate a condition or a plurality of parameters of the sealing system based upon a diffraction peak generated from the plurality of grating elements 42, 44 of the cable 36. Parameters may include temperature, strain, pressure, vibrations, or the like. The exemplary cable 36 generates multiple strong diffraction peaks, thereby facilitating segregation of various parameters. In the illustrated embodiment, the first grating element 42 is configured to reflect a first wavelength of light in phase. The reflected optical signal from the grating element 42 may be indicative of temperature at the seal-rotor interface. Also, the second grating element 44 is configured to reflect a second wavelength of light in phase. The reflected optical signal from the grating element 44 may be indicative of strain at the seal-rotor interface. In one example, the grating element 44 may be an apodized short period grating. An output signal indicative of the parameters of the sealing system may be transmitted to an output device such as a controller, personal computer, personal device, laptop, or server. The output information may be used to address concerns or effectuate changes in the machine.

Figure 4:
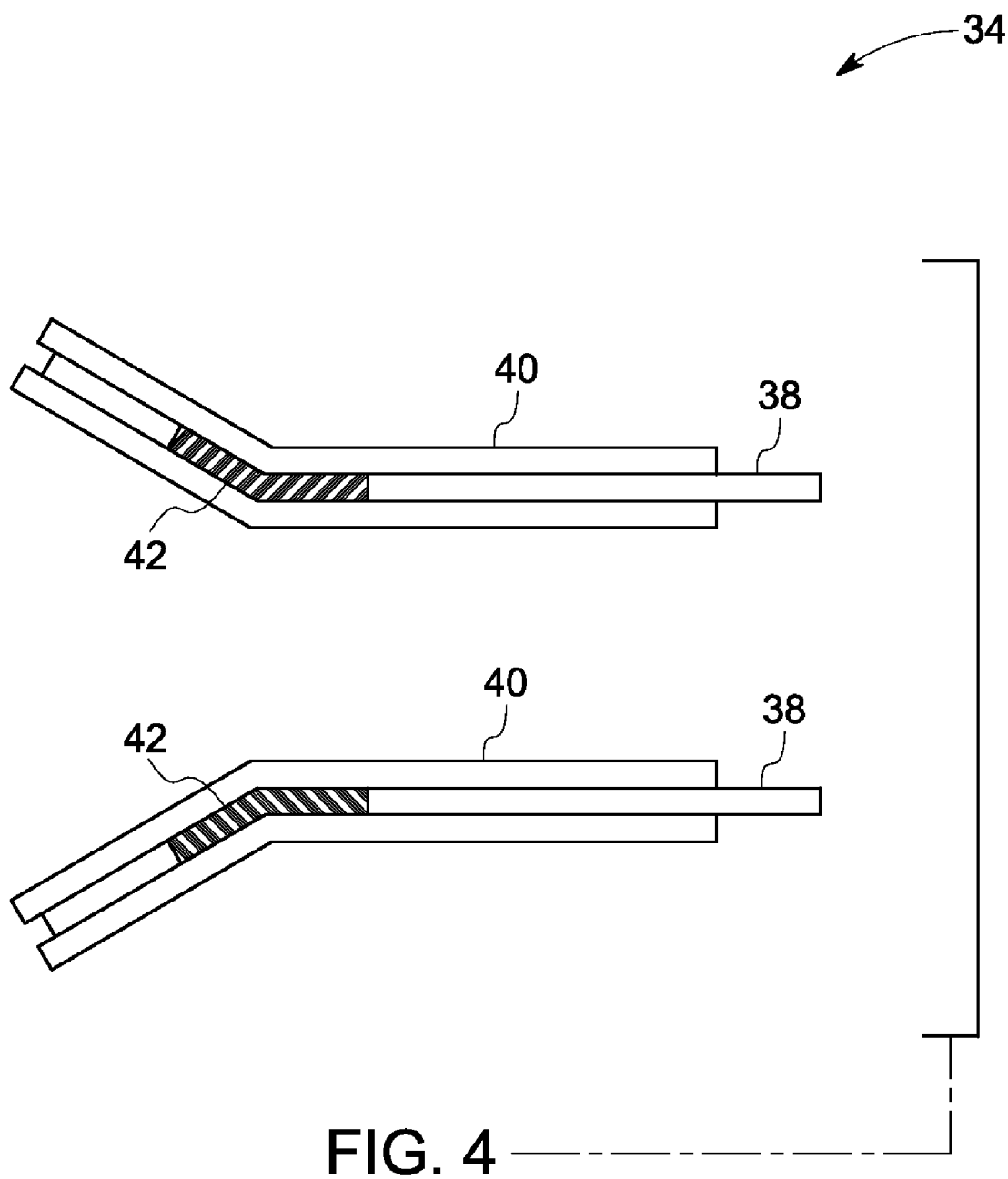
FIG. 4 is a diagrammatical view of a tilted (strained) optical fiber Bragg grating-based sensor indicating tensile and compressive strain in accordance with aspects of FIG. 3.

Referring to FIG. 4, a fiber optic sensor is 34 in accordance with an exemplary embodiment of the present invention is illustrated. In the illustrated embodiment, the sensor 34 includes the grating element 42. In this embodiment, the grating element 42 is a tilted short-period grating element with Gaussian profile apodization. In one embodiment, the element may be tilted 2 to 5 degrees relative to a horizontal axis of the sensor 34. In another embodiment, the short-period Bragg grating element may have an apodized profile and periodic refractive index modulation along the fiber core axis. As discussed above, during operation, an input light signal is provided from the light source to the sensor cable and a portion of the input light signal is reflected by the Bragg grating element 42 in phase and corresponding to a certain wavelength of light. The exemplary sensor utilize a wavelength encoding within the core 38 to measure a parameter based upon a Bragg resonant wavelength shift that is determined by the product of the effective core refractive index and periodicity of the grating modulation. In the illustrated example, the grating element 42 may be tilted upwards when there is a tensile strain at the seal-rotor interface during operation of the machine. This results in an upward shift in wavelength of light reflected from the element 42. Tensile strain may be detected based on the upward shift in wavelength of reflected light signal. Also, the grating element 42 may be tilted downwards when there is a compressive strain at the seal-rotor interface during operation of the machine. This results in downward shift in wavelength of light reflected from the element 42. Compressive strain may be detected based on downward shift in wavelength of reflected light signal. Similarly in other embodiments one or more parameters may be detected based on shift in wavelength of light signals reflected from plurality of grating elements. The exemplary sensors facilitate distributed sensing of multiple parameters and are capable of withstanding harsh environmental conditions such as elevated temperatures and high pressures, for example. It should be noted herein that grating elements providing indication of temperature, strain, pressure, vibration, or the like may either be collocated or in separate sensor cables.

Figure 5:
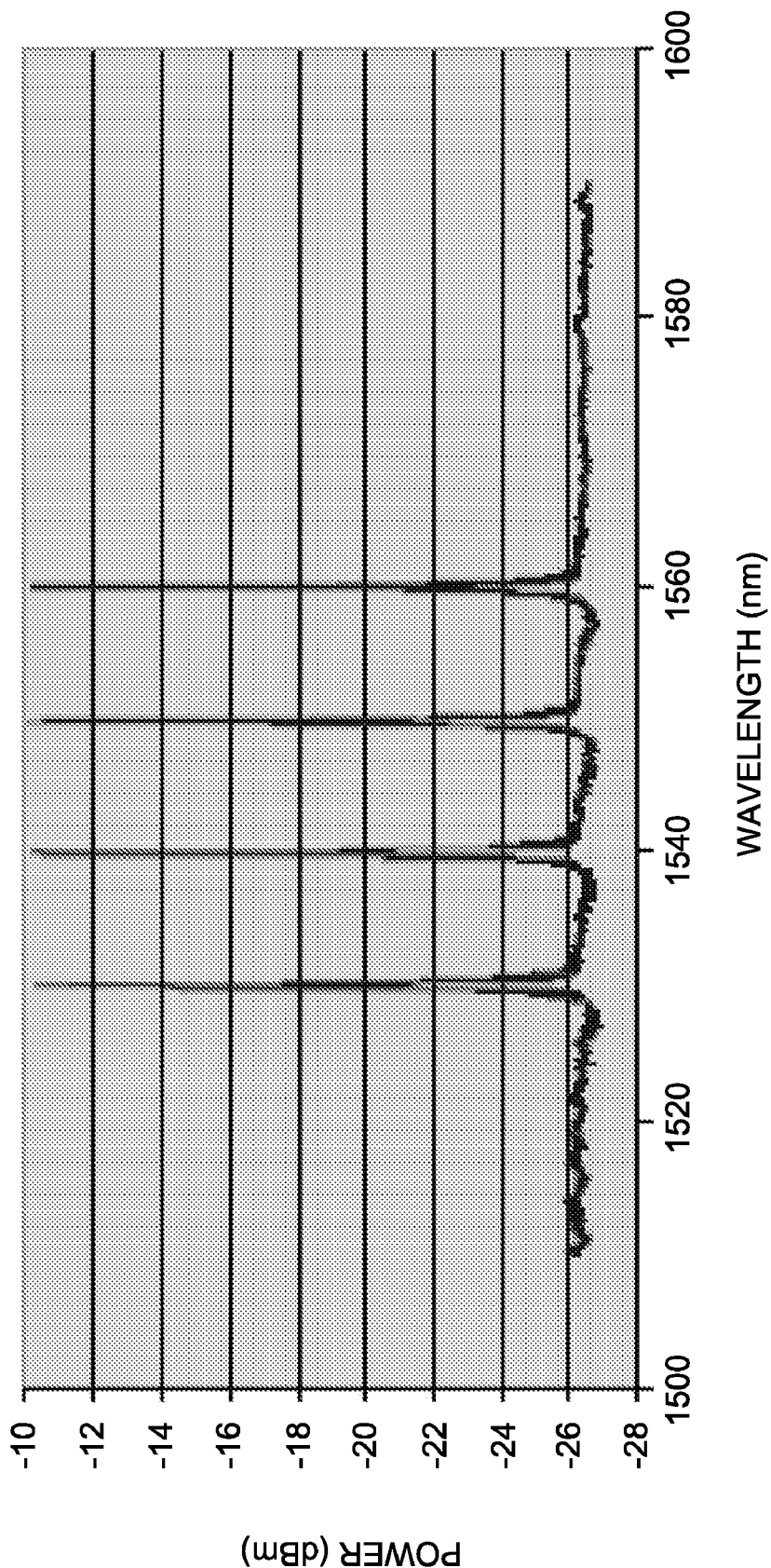
FIG. 5 represents the temperature sensing array's reflected power spectra from four fiber Bragg gratings in accordance with an exemplary embodiment of the present invention.

Referring to FIG. 5, reflectance from a sensing array having four short-period Bragg grating elements is illustrated in accordance with an exemplary embodiment of the present invention. The illustrated figure represents variation of power expressed in decibels above 1 milliwatt versus (dBm) wavelength expressed in nanometers (nm). In the exemplary embodiment, a central wavelength of a first grating element may be approximately 1530 nm, and the separation between grating elements may be approximately 10 nm. The dynamic range of the temperature-sensing array is about 15 dB. The wearing of the bristles in the rotor-seal interface is detected by the temperature sensors' response to the thermal variation. It should be noted herein that the illustrated figure is an exemplary embodiment, and the sensor number and their wavelength interval may vary depending upon the application.

Figure 6:
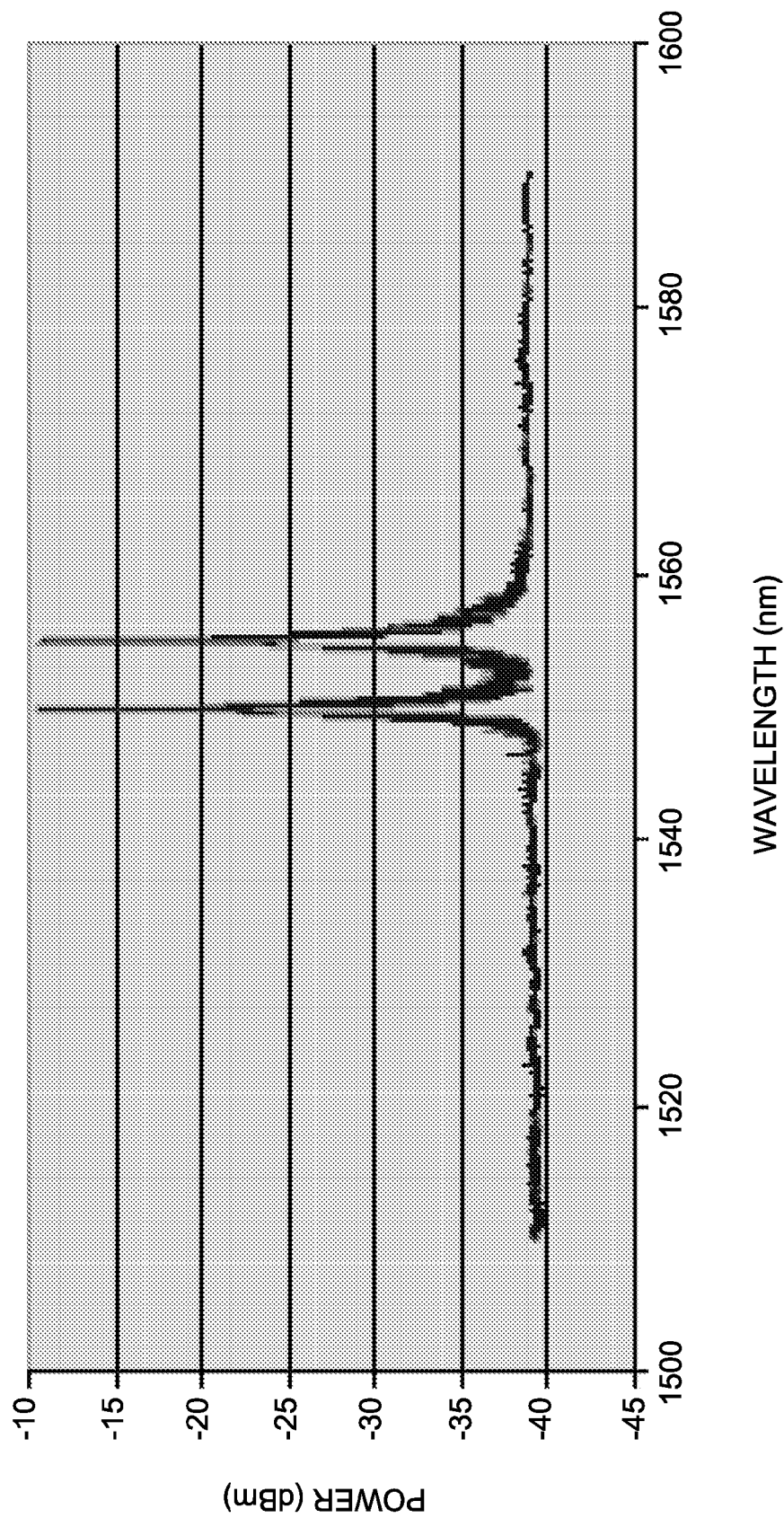
FIG. 6 represents a reflected power spectra from temperature and strain fiber Bragg grating-based sensors in accordance with an exemplary embodiment of the present invention.

Referring to FIG. 6, reflectance measurement from two fiber Bragg grating elements is illustrated in accordance with an exemplary embodiment of the present invention. The illustrated figure represents variation of power expressed in decibels above 1 milliwatt (dBm) versus wavelength expressed in nanometers (nm). In the illustrated embodiment, one grating element is configured for sensing temperature, and other grating element is configured for sensing strain or vibration. The separation between two sensors may be approximately 5 nm. In the rotor-seal interface, although both sensors may simultaneously respond to thermal variation, only the strain sensor responds to both thermal and mechanical strain. The absolute strain is calculated by differentiating the thermal-induced wavelength shift from the strain sensor's response. It should be noted herein again that the illustrated figure is an exemplary embodiment, and the sensor number and their wavelength interval may vary depending upon the application.

Figure 7:
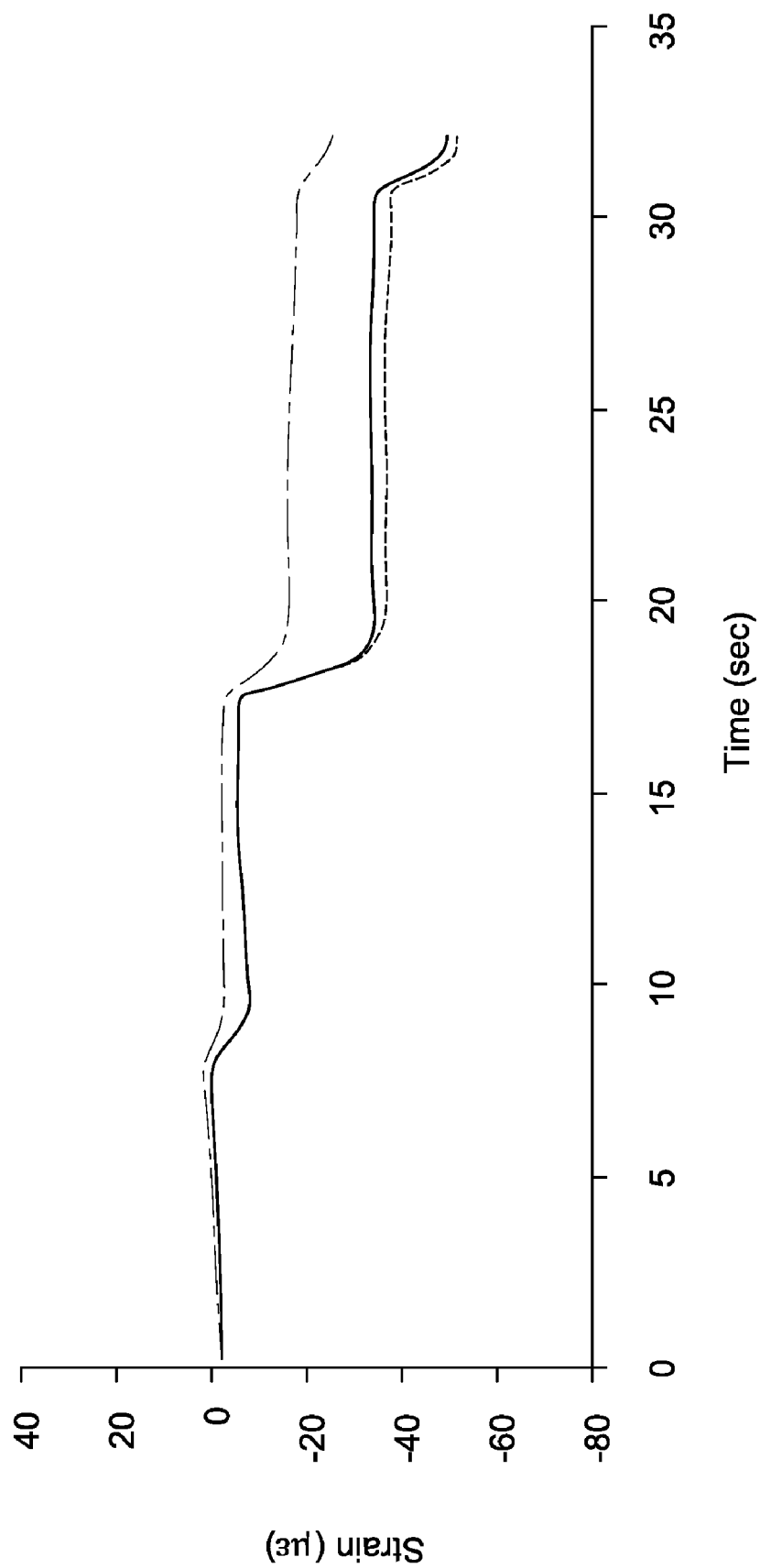
FIG. 7 represents a reflected strain response from a plurality of strain fiber Bragg grating-based sensors in accordance with an exemplary embodiment of the present invention.

Referring to FIG. 7, a reflected strain response from a plurality of strain fiber Bragg grating-based sensors is illustrated in accordance with an exemplary embodiment of the present invention. The illustrated figure represents variation of strain versus time expressed in seconds (sec). At a predetermined speed of the machine, when there is a pressure drop across the sealing system there is a change in strain in the sealing system. In other words, when the pressure drop across the sealing system increases, the sensors detect an increase in strain in the sealing system. It should be noted herein that the illustrated example is an exemplary embodiment and should not be construed as limiting the scope of the invention.

Figure 8:
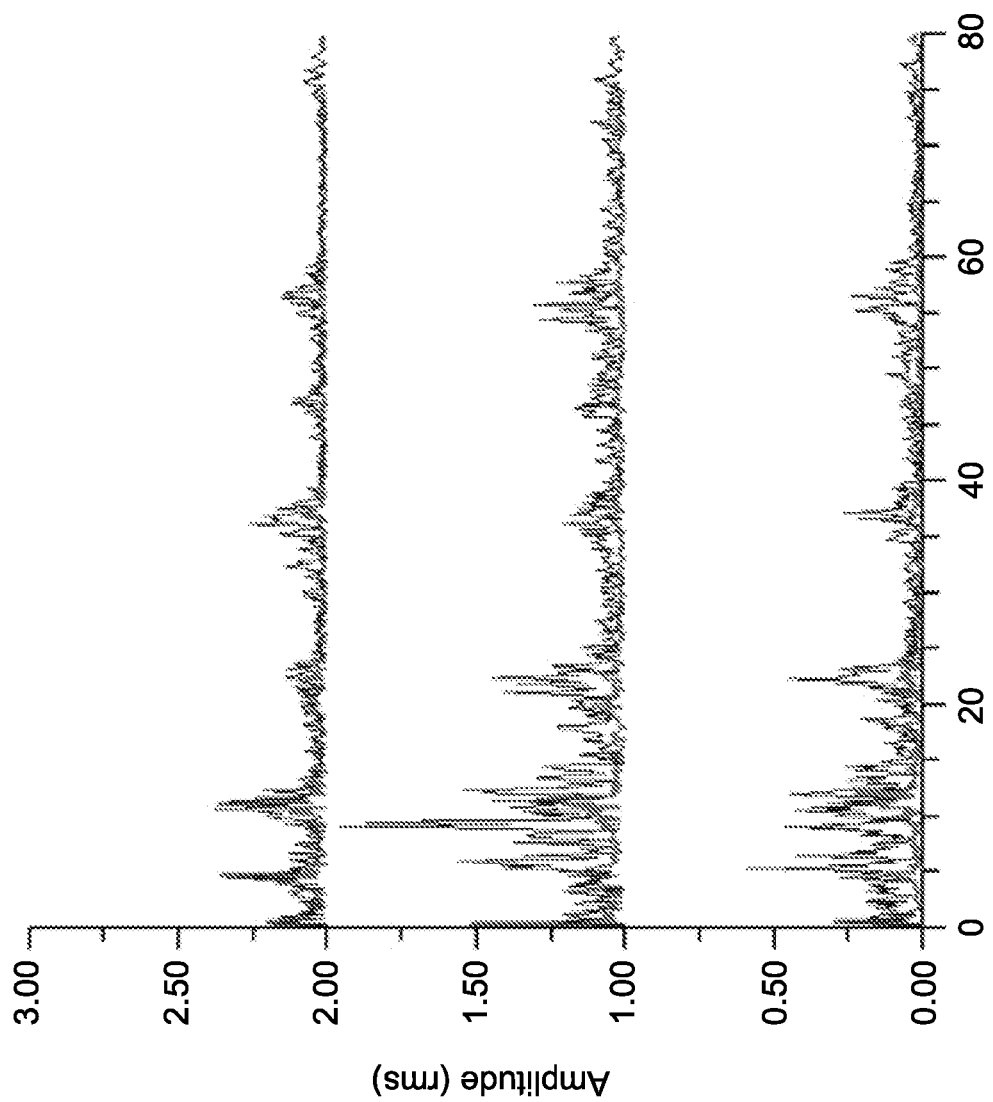
FIG. 8 represents a dynamic strain response from a plurality of strain fiber Bragg grating-based sensors in accordance with an exemplary embodiment of the present invention.

Referring to FIG. 8, a dynamic strain response from a plurality of strain fiber Bragg grating-based sensors is illustrated in accordance with an exemplary embodiment of the present invention. The illustrated figure represents variation of root mean square amplitude expressed in decibels versus vibration frequency expressed in Hertz (Hz). The figure shows a plurality of curves representative of dynamic strain response within the sealing system from 3 sensors under different operating conditions such as load, and speed conditions of the machine. Offset between curves is artificially imposed to illustrate distinct response from each of the three sensors. Here again, it should be noted herein that the illustrated example is an exemplary embodiment and should not be construed as limiting the scope of the invention.

Figure 9:
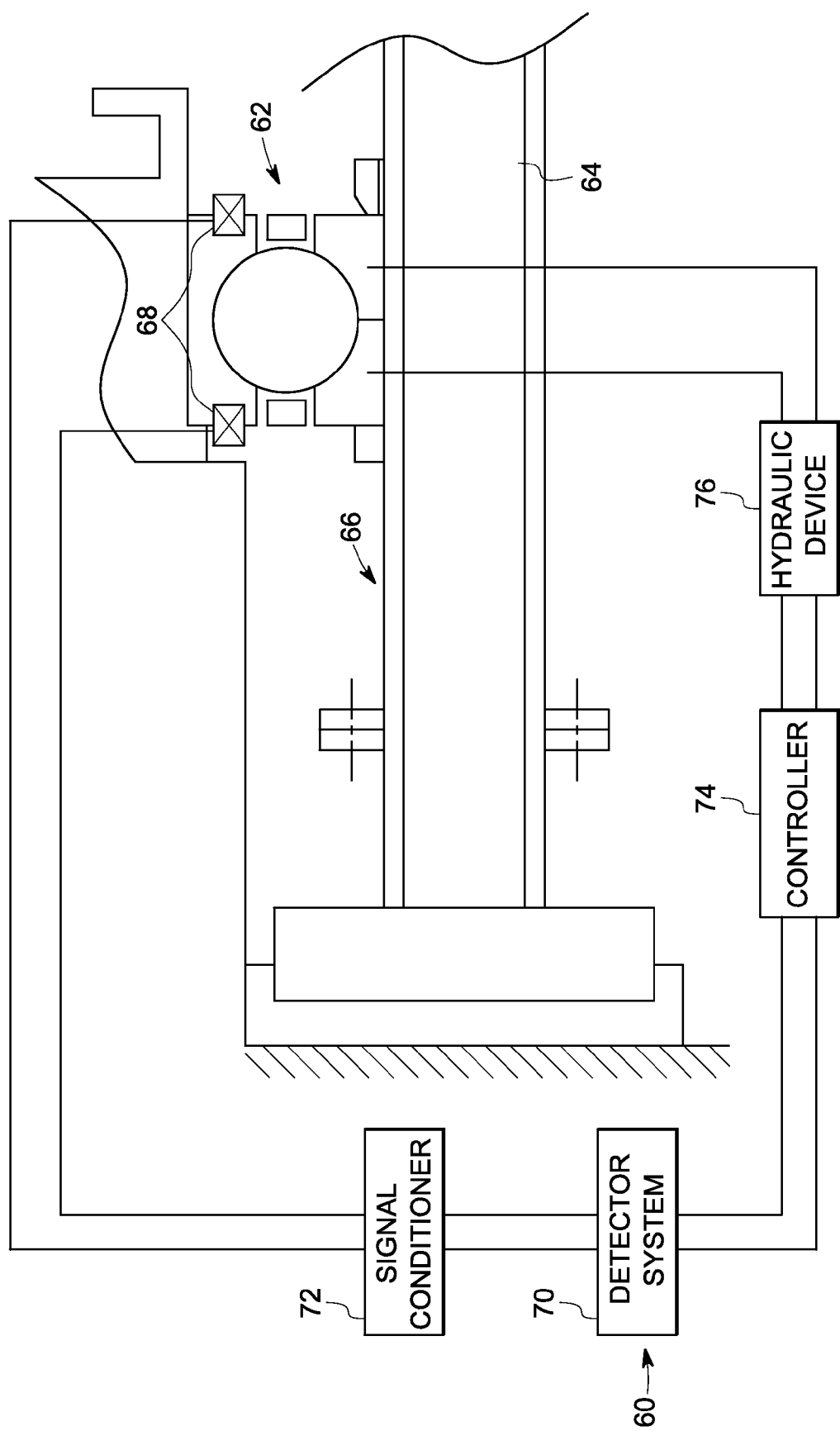
FIG. 9 is a diagrammatical view of a system for measuring and controlling thrust load on a rotor bearing of a rotary machine in accordance with an exemplary embodiment of the present invention.

Referring to FIG. 9, an exemplary system 60 for measuring and controlling thrust load on one or more bearings 62 coupled to rotor 64 of a rotary machine 66 is illustrated. The system 60 includes a plurality of sensors 68 disposed proximate to the bearing 62 of the machine 66. As discussed in previous embodiments, during operation, an input light signal is provided from a light source (not shown) to the sensors 68 and a portion of the input light signal is reflected by the grating elements of the sensors 68 in phase and corresponding to certain wavelengths of light.

The sensing system 60 also includes an optical coupler (not shown) configured to regulate the incoming light signal from the light source and also the reflected signals from the sensors 68. The optical coupler directs the appropriate reflected signals to a detector system 70 such as a photo detector system via a signal conditioner 72. The detector system 70 receives the reflected optical signals and provides an output signal to a controller 74. The controller 74 is configured to analyze the embedded information in the output signal from the detector system 70 and estimate a condition or a plurality of parameters of the thrust bearing 62 based upon a diffraction peak generated from the plurality of grating elements of the sensors 68. In the illustrated example, the parameters may include static strain, dynamic strain, or combinations thereof. The controller 74 determines the parameters based on a shift in wavelength of light signals reflected from the sensors 68. Also, the controller determines a magnitude and direction of thrust load (e.g. axial load) on the bearings 62 based on sensed parameters. The controller 74 actuates a hydraulic device 76 to direct a hydraulic fluid from the hydraulic device 76 to the thrust bearing 62 to mitigate the thrust load on the bearing 62. For example, if the thrust load is greater than a threshold value hydraulic device 76 is actuated to supply the hydraulic fluid to the bearing 62 and thereby counteract the thrust load on the bearing 62. The system 60 works as closed-loop control system enables to counteract thrust load on the bearings 62 for damage prognosis. The exemplary sensors facilitate distributed sensing of multiple parameters of thrust bearing and are capable of withstanding harsh environmental conditions such as elevated temperatures and high pressures, oil conditions, for example. Although tubomachinery environments are discussed in the above embodiments, the exemplary fiber optic sensing system is also applicable to detect one or more parameters of devices operating in other environments.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A rotary machine, comprising:
a stationary component;
a rotary component disposed inside the stationary component;
a brush sealing system disposed between the stationary component and the rotary component, comprising:
a holding device coupled to the stationary component;
a plurality of bristles, each bristle having a first end coupled to the holding device and a second end protruding from the holding device towards the rotary component; and
a fiber optic sensing system comprising one or more fiber optic sensors disposed between the bristles and configured to detect one or more parameters related to the brush sealing system comprising temperature, strain, pressure, vibration, or combinations thereof.

2. The rotary machine of claim 1, wherein the holding device comprises a first plate and a second plate configured to hold the plurality of bristles.

3. The rotary machine of claim 1, wherein the fiber optic sensor comprises a core and a cladding disposed around the core.

4. The rotary machine of claim 3, wherein the fiber optic sensor comprises at least two grating elements disposed in the core; wherein the two grating elements are separated by a predetermined distance.

5. The rotary machine of claim 4, wherein the fiber optic sensing system further comprises a light source configured to illuminate the core.

6. The rotary machine of claim 5, wherein a first grating element is configured to reflect a first wavelength of light in phase.

7. The rotary machine of claim 6, wherein a second grating element is configured to reflect a second wavelength of light in phase.

8. The rotary machine of claim 6, further comprising a detector system configured to detect one or more parameters related to the brush sealing system comprising temperature, strain, pressure, vibration, or combinations thereof based on shift in wavelength of light reflected from the grating elements.

9. A brush sealing system comprising:
a holding device;
a plurality of bristles, each bristle having a first end coupled to the holding device and a second end protruding from the holding device; and
a fiber optic sensing system comprising one or more fiber optic sensors disposed between the bristles and configured to detect one or more parameters related to the brush sealing system comprising temperature, strain, pressure, vibration, or combinations thereof.

10. The brush sealing system of claim 9, wherein the plurality of fiber optic sensors are disposed along a circumferential direction between the bristles.

11. The brush sealing system of claim 9, wherein the fiber optic sensor comprises a core and a cladding disposed around the core.

12. The brush sealing system of claim 11, wherein the fiber optic sensor comprises at least two Bragg grating elements disposed in the core; wherein the two grating elements are separated by a predetermined distance.

13. The brush sealing system of claim 12, wherein the fiber optic sensing system further comprises a light source configured to illuminate the core.

14. The brush sealing system of claim 13, wherein a first Bragg grating element is configured to reflect a first wavelength of light in phase.

15. The brush sealing system of claim 14, wherein the first Bragg grating element comprises a tilted short-period grating element.

16. The brush sealing system of claim 14, wherein a second Bragg grating element is configured to reflect a second wavelength of light in phase.

17. The brush sealing system of claim 16, wherein the second bragg grating element comprises a tilted grating element.

18. The brush sealing system of claim 16, wherein the second grating element comprises an apodized short-period Bragg grating element.

19. The brush sealing system of claim 16, further comprising a detector system configured to detect one or more parameters related to the brush sealing system comprising temperature, strain, pressure, vibration, or combinations thereof based on shift in wavelength of light reflected from the grating elements.

20. The brush sealing system of claim 16, wherein tensile strain is detected based on shift in wavelength of reflected light along an upward direction.

21. The brush sealing system of claim 16, wherein compressive strain is detected based on shift in wavelength of reflected light along a downward direction.

* * * * *